United States Patent [19]

Jett

[11] Patent Number: 4,580,789

[45] Date of Patent: Apr. 8, 1986

[54] SHAFT SEAL CONSTRUCTION FOR BIN LEVEL INDICATORS

[75] Inventor: Richard G. Jett, Saint Charles, Ill.

[73] Assignee: Ludlow Industries, Inc., Elburn, Ill.

[21] Appl. No.: 663,990

[22] Filed: Oct. 23, 1984

[51] Int. Cl.$^4$ .............................................. F16J 15/34
[52] U.S. Cl. ...................................... 277/65; 277/88; 277/96.2
[58] Field of Search ................. 277/65, 88, 96.2, 133, 277/152, 153

[56] References Cited

U.S. PATENT DOCUMENTS

| | | | |
|---|---|---|---|
| 3,914,072 | 10/1975 | Rowley et al. | 277/65 |
| 3,988,026 | 10/1976 | Kemp | 277/65 |
| 4,289,320 | 9/1981 | Altnau | 277/88 |
| 4,427,202 | 1/1984 | Backlin | 277/65 |
| 4,515,377 | 5/1985 | Johnson | 277/65 |

Primary Examiner—Robert I. Smith
Attorney, Agent, or Firm—Burmeister, York, Palmatier, Hamby & Jones

[57] ABSTRACT

The shaft seal construction is employed in a bin level indicator between the housing and the rotatable shaft thereof. The housing has an enlarged bore therein concentric with the shaft. A composite pressure sealing ring is disposed in sealing relation between the shaft and the bore. Such ring has a rubber-like pressure sealing ring member facing forwardly and a metal backing ring member behind the rubber-like ring member and preferably bonded thereto. The rubber-like ring member has a peripheral surface in sealing engagement with the bore, and a forwardly projecting annular sealing lip in rotary sealing engagement with the shaft. The metal backing ring member has a peripheral surface compressibly engaging the bore with an interference fit therebetween. A rubber-like vacuum sealing ring is disposed behind the metal backing ring member and is provided with a first frusto-conical sealing lip, engaging the backing ring member, and a second annular sealing lip in sealing engagement with the shaft.

14 Claims, 9 Drawing Figures

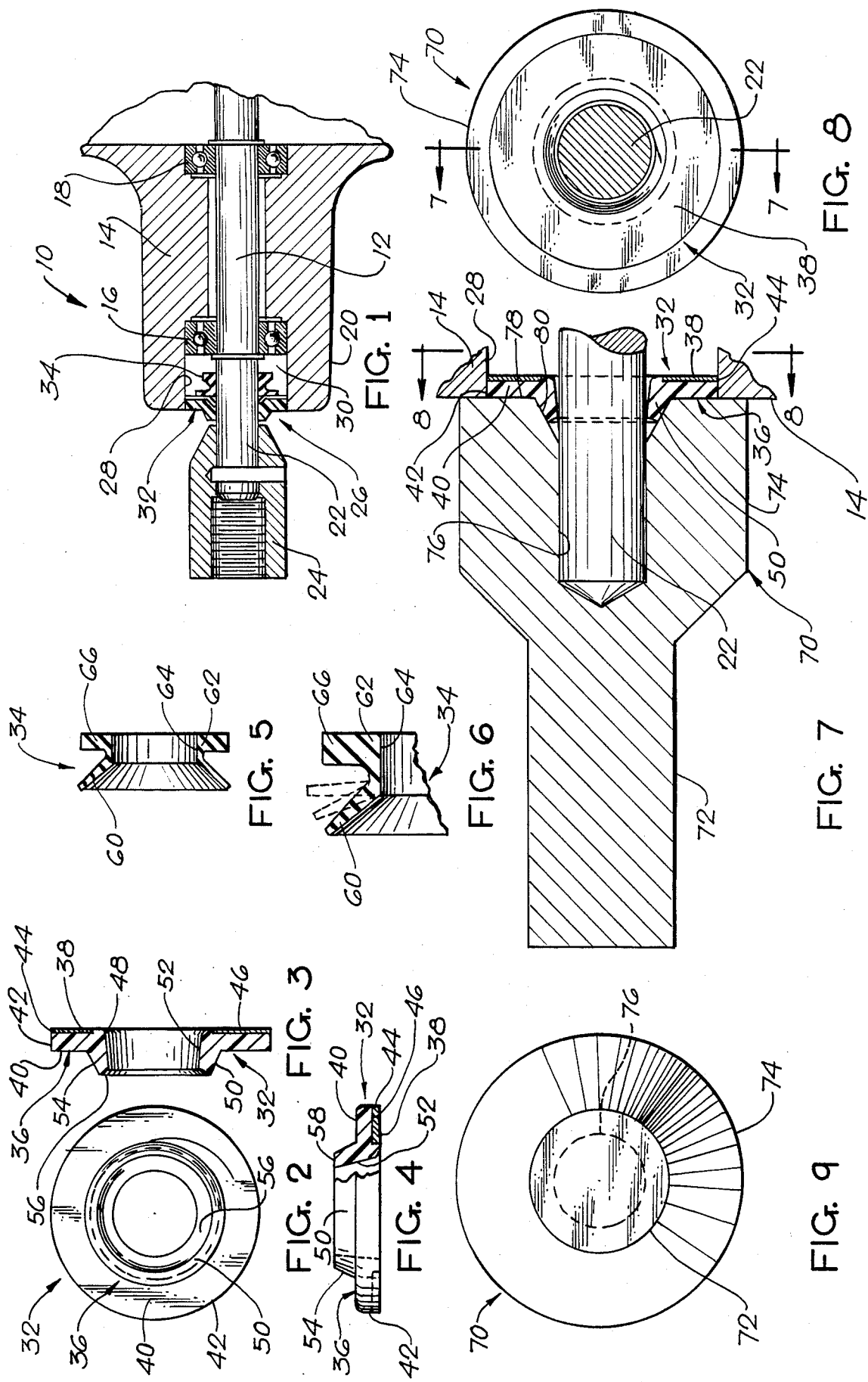

SHAFT SEAL CONSTRUCTION FOR BIN LEVEL INDICATORS

FIELD OF THE INVENTION

This invention relates to a shaft seal construction for a bin level indicator of the type having a rotary shaft which carries a rotary paddle or the like, adapted to be engaged by rising material in a bin or other container. When the rising material impedes or stops the rotation of the paddle, the bin level indicator produces an electrical signal, as by the operation of a switch in the bin level indicator. The electrical signal may be employed to operate a warning device, to stop the flow of the material into the bin, to cause the material to flow out of the bin, or to perform other control functions.

BACKGROUND OF THE INVENTION

Bin level indicators of the rotary paddle type, as briefly described above, are disclosed in many prior patents, including the Jett U.S. Pat. No. 4,318,624, issued Mar. 9, 1982, in which the present applicant was the applicant.

The present invention is directed to the problem of providing an improved shaft seal construction, to produce a rotary seal between the rotary shaft and the housing of such a bin level indicator of the rotary type. A seal is needed to prevent leakage around the shaft, either between the bin and the housing of the bin level indicator, or between the housing and the bin, or both.

The interior of the housing is generally at atmospheric pressure. In some cases, the interior of the bin is pressurized, above atmospheric pressure, so that the shaft seal needs to withstand the pressure in the bin, to prevent leakage between the bin and the housing. If such leakage occurs, the bin level indicator may be damaged by dust or other material, leaking from the bin. Moreover, the leakage of any material from the bin is always undesirable.

In other cases, some degree of vacuum may exist in the bin, so that the interior of the bin is at a subatmospheric pressure. In that case, a vacuum seal is needed to prevent leakage of air into the bin from the housing of the bin level indicator.

Any shaft seal tends to produce a frictional drag on the rotary shaft. The shaft seal needs to be constructed to minimize such drag, so as to prevent the drag from unduly impeding the rotation of the shaft.

SUMMARY OF THE INVENTION

One object of the present invention is to provide a new and improved shaft seal construction which is fully operative to prevent leakage around the shaft under conditions of pressure in the bin, and preferably also under conditions of vacuum in the bin.

A further object is to provide a new and improved shaft seal construction, such that the rotation of the shaft is not unduly impeded by frictional drag.

Another object is to provide a new and improved shaft seal construction which is highly cost effective, in that it utilizes a minimum number of components which are low in cost, while providing a highly effective and dependable seal which has a long operating life.

To achieve these and other objectives, the present invention preferably provides a shaft seal construction for a bin level indicator, comprising a housing, a rotatable shaft having a front portion projecting out of the housing, bearing means rotatably supporting the shaft in the housing, a substantially cylindrical bore in the housing, concentric with the shaft, and substantially larger in diameter than the shaft, to provide an annular seal receiving space between the shaft and the interior cylindrical wall of the bore, and a composite pressure sealing ring disposed between the shaft and such interior cylindrical wall, such composite pressure sealing ring comprising a soft resilient forwardly facing ring member and a metal backing ring member, behind the soft resilient ring member and facing inwardly, toward the interior of the housing, the soft resilient sealing ring member having a peripheral surface in sealing engagement with the interior cylindrical wall of the bore, the soft resilient ring member also having a forwardly projecting annular sealing lip in sealing engagement with the shaft, the metal backing ring member having a peripheral surface compressibly engaging the interior cylindrical wall of the bore, with an interference fit therebetween, whereby the metal backing ring member is securely retained in the bore while also forming a seal therewith.

The shaft seal construction also preferably comprises a soft resilient vacuum sealing ring disposed behind the metal backing ring member, such vacuum sealing ring having a first annular sealing lip in sealing engagement with the metal backing ring member, and a second annular sealing lip projecting toward the interior of the housing and in sealing engagement with the shaft.

The soft resilient pressure sealing ring member is preferably made of a rubber-like material, such as a suitable synthetic rubber or a suitable resinous plastic material.

The soft resilient vacuum sealing ring is also preferably made of a suitable rubber-like material, such as a suitable synthetic rubber.

The metal backing ring member may be bonded to the soft resilient pressure sealing ring member.

If there is a positive pressure in the bin, such pressure acts upon the forwardly projecting annular sealing lip of the pressure sealing ring member and causes increased sealing pressure between the lip and the shaft. The initial sealing pressure, exerted by the lip itself, may be quite low to minimize the frictional drag on the rotary shaft.

The initial sealing pressure exerted by the vacuum sealing ring may also be quite low to minimize frictional drag on the shaft. If there is a partial vacuum in the bin, the external atmospheric pressure acts upon the annular lips of the vacuum sealing ring and increases the sealing pressure to maintain an effective vacuum seal.

BRIEF DESCRIPTION OF THE DRAWINGS

Further objects, advantages and features of the present invention will appear from the following description, taken with the accompanying drawings, in which:

FIG. 1 is a fragmentary central longitudinal section, taken through a rotary bin level indicator and showing a shaft seal construction to be described as an illustrative embodiment of the present invention.

FIG. 2 is an end view showing the outer side of the pressure sealing ring for the shaft seal construction of FIG. 1.

FIG. 3 is a central section, taken through the pressure sealing ring of FIG. 2.

FIG. 4 is an edge view, partly in central section, showing a slightly modified pressure sealing ring, similar to the ring of FIGS. 2 and 3.

FIG. 5 is an enlarged central section taken through the vacuum sealing ring for the shaft seal construction of FIG. 1, with the ring in a free state.

FIG. 6 is a fragmentary enlarged section, similar to FIG. 5, but showing the flexing of the frontwardly projecting annular sealing lip.

FIG. 7 is a central longitudinal section, taken generally along the line 7—7 in FIG. 8, and showing a special tool for installing the pressure sealing ring of FIG. 1 into the bin level indicator.

FIG. 8 is an end view, showing the shaft in section, along the line 8—8 in FIG. 7.

FIG. 9 is an opposite end view of the tool shown in FIG. 7.

DETAILED DESCRIPTION OF AN ILLUSTRATIVE EMBODIMENT

FIG. 1 comprises a fragmentary illustration of a rotary paddle type bin level indicator 10, including a rotary shaft 12 which is rotatably mounted in a housing 14 by bearing means, illustrated as outer and inner ball bearings 16 and 18. The housing 14 has a nose portion 20 adapted to be securely mounted on the wall of a bin or other container. The shaft 12 has an outer end portion 22 which extends out of the nose portion 20 of the housing 14 and is adapted to extend into the bin or other container through an opening therein.

The outer shaft portion 22 is adapted to carry a rotary paddle, as illustrated, for example, in the previously mentioned Jett U.S. Pat. No. 4,318,624. As shown in FIG. 1, the outer shaft portion 22 is provided with an adapter fitting 24, into which the paddle may be screwed. The paddle is rotated by the shaft 12, which in turn is rotated by an electric motor in the housing 14. Typically, the bin level indicator 10 is employed on a bin adapted to hold a granular material. When the bin is being filled, the material rises until it impedes or stops the rotation of the paddle. The bin level indicator 10 then produces an electrical signal, as by the operation of an electrical switch in the housing 14. Such electrical signal may be employed to operate an alarm device, to stop the flow of material into the bin, to cause the material to flow out of the bin, or to perform other control functions.

FIG. 1 illustrates a preferred embodiment of the present invention, in the form of a shaft seal construction 26 which prevents leakage around the shaft 12, either into or out of the housing 14. The seal construction 26 provides both a pressure seal and a vacuum seal, so that leakage is prevented under conditions of both positive pressure and partial vacuum within the bin.

The shaft seal construction 26 is disposed between the shaft 12 and a concentric cylindrical bore 28, formed axially in the nose portion 20 of the housing 14. The bore 28 is substantially larger in diameter than the shaft 12, so that an annular space 30 is formed between the shaft 12 and the bore 28. The shaft seal construction 26 is disposed in the annular space 30. In this case, the outer ball bearing 16 is also fitted into the bore 28, behind the seal construction 26.

The shaft seal construction 26 comprises a composite pressure sealing ring 32, illustrated separately in FIGS. 2-4, and a vacuum sealing ring 34, illustrated separately in FIGS. 5 and 6. The composite pressure sealing ring 32 forms a pressure seal between the shaft 12 and the interior cylindrical wall of the bore 28. In this case, the vacuum sealing ring 34 forms a vacuum seal between the shaft 12 and the composite pressure sealing ring 32.

If a vacuum seal is not needed, it is possible to use the composite pressure sealing ring 32, without using the vacuum sealing ring 34.

As shown in FIGS. 1-4, the composite pressure sealing ring 32 comprises a soft resilient pressure sealing ring member 36, facing outwardly from the housing 14, and a backing ring member 38, made of metal or comparable material, and disposed behind the soft resilient ring member 36, so as to face into the housing 14. Preferably, the soft resilient ring member 36 and the metal backing ring member 38 are adhesively bonded together.

The soft resilient pressure sealing ring member 36 is preferably made of a rubber-like material, such as a suitable synthetic rubber or a suitable resinous plastic material. For example, the soft resilient ring member 36 may be made of BUNA-N rubber or TFE (trifluoroethylene).

The metal backing ring member or plate 38 is preferably made of steel, or any other suitable metal or comparable material.

The rubber-like pressure sealing ring member 36 is illustrated as having a forwardly projecting annular flange 40 having a peripheral surface 42 which is in sealing engagement with the interior cylindrical wall of the bore 28, when the composite pressure sealing ring 32 is installed in the housing 14, as shown in FIG. 1. The flange 40 is backed up by the metal ring member 38, which is in the form of a flat annular plate having a peripheral edge surface 44, compressively engaging the interior cylindrical wall of the bore 28, with an interference fit therebetween, when the composite ring 32 is installed. The interference fit securely retains the metal backing ring 38 within the bore 28, while also providing a tight seal therebetween. The metal backing ring 38 is preferably fitted into an annular recess 46, formed in the rear side of the rubber-like ring member 36, so that the backing ring member 38 is flush with the rear surface 48 of the rubber-like ring member 36.

The rubber-like pressure sealing ring member 36 is also provided with a frontwardly projecting annular lip 50 which is adapted to receive the outer portion 22 of the shaft 12, in sealing engagement therewith. When the annular lip 50 is mounted around the shaft 12, the lip is stretched or flexed so as to form an initial seal with the shaft. However, the initial sealing pressure is kept quite low, so as to minimize the frictional drag on the shaft 12, while maintaining an effective seal.

Because the annular lip 50 projects forwardly, the lip is pressed more firmly against the shaft 12 by any pressure which may exist in the bin. Thus, the rubber-like pressure sealing ring 36 is able to withstand considerable pressure, while still maintaining an effective rotary seal around the shaft 12.

It will be seen that the annular lip 50 has an interior frusto-conical surface 52 which tapers in diameter toward the end of the lip. Moreover, the lip 50 has a frusto-conical exterior surface 54 which tapers more sharply toward the end of the lip 50, so that the lip tapers in thickness toward its frontwardly projecting end. As shown in FIG. 3, the annular lip 50 has a tapered end surface 56 which is slightly cupped or dished. FIG. 4 shows a slightly modified construction in which the lip 50 has a flat end surface 58, in a substantially radial plane.

As shown in FIGS. 1, 5 and 6, the soft resilient vacuum sealing ring 34 preferably comprises first and second annular sealing lips 60 and 62 which are in sealing engagement with the backing ring member 38 and the shaft 12, when the vacuum sealing ring 34 is installed. The vacuum sealing ring 34 is preferably made of a suitable soft resilient rubber-like material, such as a suitable synthetic rubber. For example, the ring 34 may be made of nitrile rubber.

The first annular sealing lip 60 is initially frusto-conical in shape and slightly tapered in thickness, as shown in FIG. 5. The annular lip 60 flares outwardly and faces toward the metal backing ring member 38, for sealing engagement therewith, when the ring 34 is installed, as shown in FIG. 1. The annular lip 60 is flexible forwardly and rearwardly, as shown by the broken line positions in FIG. 6 and the installed position of FIG. 1.

The second annular lip 62 has an interior surface 64 which is substantially cylindrical in shape and is adapted to be received around the shaft 12, in sealing engagement therewith, as shown by the installed position of FIG. 1. The interior surface 64 is initially somewhat smaller in diameter than the shaft 12. The lip 62 is stretched when the ring 34 is installed around the shaft 12, to provide initial sealing engagement between the interior surface 64 and the shaft 12. The second annular lip 62 projects rearwardly from the inner portion of the first annular lip 60 and is directed toward the interior of the housing 14. It will be seen that the second annular sealing lip 62 is reinforced by an outwardly projecting flange 66. When there is a partial vacuum in the bin, so that the pressure in the bin is subatmospheric, the atmospheric pressure in the interior of the housing 14 presses the first annular lip 60 against the backing ring member 38, while pressing the second annular lip 62 against the outside of the shaft 12. Thus, an effective vacuum seal is established and maintained, so as to prevent leakage of air from the interior of the housing 14 into the bin.

FIGS. 7, 8 and 9 illustrate a special tool 70, which facilitates the installation of the composite pressure sealing ring 32, by making it easy to press the ring 32 into the bore 28, despite the fact that there is an interference fit between the cylindrical inner wall of the bore 28 and the outer edge surface 44 of the metal backing ring member 38.

As illustrated, the special pressing tool 70 is elongated in elevation and circular in cross-section. The tool 70 has a cylindrical shank 72 and an enlarged cylindrical head 74 having an axial bore 76 adapted to receive the outer shaft portion 22 with a sliding fit. The head 74 has a flat annular end surface 78. A frusto-conical interior surface 80 is provided on the head 84, between the flat end surface 78 and the cylindrical interior surface of the bore 76. The frusto-conical surface 80 forms a tapered annular recess for receiving the tapered annular lip 50 of the rubber-like pressure sealing ring member 36. The flange 40 of the ring member 36 is adapted to engage the flat end surface 78 of the tool 70, as shown in FIG. 7.

When it is desired to install the composite pressure sealing ring 32, the ring is slipped around the outer shaft portion 22, and the tool 70 is positioned so that the outer shaft portion 22 slides into the bore 76. The tool 70 is then slid along the outer shaft portion 22, so that the tool pushes the composite ring 32 into the bore 28 in the housing 14. By the use of a press or otherwise, sufficient force is exerted between the tool 70 and the housing 14 to press the metal backing ring member 38 into the bore 28, despite the interference fit therebetween. Because the tool 70 is guided by the outer shaft portion 22, the tool 70 makes it easy to maintain the composite pressure sealing ring 32 in alignment with the bore 28, while also insuring that the ring 32 is pressed straight into the bore 28, without any cocking or angular misalignment.

During the operation of the bin level indicator 10, there is always sealing engagement between the cylindrical interior surface of the bore 28 and the peripheral surfaces 42 and 44 of the rubber-like ring member and the metal backing ring 38. Moreover, the interference fit between the bore 28 and the peripheral surface 44 of the backing ring 38 securely retains the backing ring 38 in the bore 28, so that the composite pressure sealing ring 32 is held securely in the bore 28 under all conditions.

The flexible annular lip 50 of the rubber-like pressure sealing ring member 36 is stretched around the shaft 12 and provides an initial seal therewith. If there is a positive pressure in the bin, such pressure exerts force on the exterior surface 54 of the lip 50, so as to press the lip 50 more firmly around the shaft 12. Thus, the composite pressure sealing ring 32 is capable of withstanding a considerable pressure in the bin, while still maintaining an effective seal around the shaft 12.

Both initially and under pressure loading, the sealing pressure between the flexible lip 50 and the shaft 20 is kept at a relatively low level, consistent with the maintenance of a pressure seal, to minimize the frictional drag between the lip 50 and the shaft 12.

The rubber-like vacuum sealing ring 34 maintains a seal around the shaft 12, in the event that there is a partial vacuum in the bin, so that the pressure in the bin is subatmospheric. The atmospheric pressure within the housing 14 of the bin level indicator 10 presses the frusto-conical lip 60 against the backing ring member 38, while pressing the lip 62 more firmly around the shaft 12. Here again, excessive sealing pressure is avoided, to minimize the frictional drag on the shaft 12.

It will be recognized that the rotary shaft seal construction 26 employs only a few inexpensive components, so that the shaft seal construction is low in cost, as well as being highly effective in operation. Moreover, the shaft seal construction 26 provides a long effective working life.

I claim:

1. A shaft seal construction for a bin level indicator, comprising a housing, a shaft rotatable in said housing and having a front portion extending therefrom, bearing means in said housing and rotatably supporting said shaft, said housing having a substantially cylindrical bore therein concentric with said shaft and substantially larger in diameter than said shaft, said bore and said shaft thereby forming an annular space therebetween, said bore having an interior cylindrical wall, a composite pressure sealing ring disposed in sealing relation between said shaft and said interior cylindrical wall of said bore, said pressure sealing ring having a soft resilient ring member facing forwardly away from said casing and a metal backing ring member disposed behind said soft resilient ring member and facing toward the interior of said housing, said soft resilient ring member having a peripheral surface in sealing engagement with said interior cylindrical wall, said soft resilient ring member having a forwardly projecting annular sealing lip in rotary sealing engagement with said shaft, said metal backing ring member having a peripheral surface compressibly engaging said interior cylindrical wall with an interference fit therebetween, and a soft resilient vacuum sealing ring disposed in said annular space behind said metal backing ring member and in sealing engagement with said shaft and said metal backing ring member, said vacuum sealing ring having a first annular sealing lip in sealing engagement with said metal backing ring member and a second annular sealing lip projecting toward the interior of said housing and in sealing engagement with said shaft.

2. A shaft seal construction according to claim 1, in which said soft resilient ring member is made of a rubber-like material.

3. A shaft seal construction according to claim 1, in which said soft resilient vacuum sealing ring is made of a rubber-like material.

4. A shaft seal construction according to claim 1, said soft resilient ring member being made of a rubber-like material, said soft resilient vacuum sealing ring being made of a rubber-like material.

5. A shaft seal construction according to claim 1, in which said metal backing ring member is bonded to said soft resilient ring member.

6. A shaft seal construction according to claim 1, in which said forwardly projecting annular sealing lip on said soft resilient ring member has a forwardly tapering internal surface in sealing engagement with said shaft.

7. A shaft seal construction for a bin level indicator, comprising a housing, a shaft rotatable in said housing and having a front portion extending therefrom, bearing means in said housing and rotatably supporting said shaft, said housing having a substantially cylindrical bore therein concentric with said shaft and substantially larger in diameter than said shaft to form an annular space therebetween, said bore having an interior cylindrical wall, and a composite pressure sealing ring disposed in sealing relation between said shaft and said interior cylindrical wall of said bore, said pressure sealing ring having a soft resilient ring member facing forwardly away from said casing and a metal backing ring member disposed behind said soft resilient ring member and facing toward the interior of said housing, said soft resilient ring member having a peripheral surface in sealing engagement with said interior cylindrical wall, said soft resilient ring member having a forwardly projecting annular sealing lip in rotary sealing engagement with said shaft, said metal backing ring member having a peripheral surface compressibly engaging said interior cylindrical wall with an interference fit therebetween.

8. A shaft seal construction according to claim 7, in which said soft resilient ring member is made of a rubber-like material.

9. A shaft seal construction according to claim 7, in which said metal backing ring member is bonded to said soft resilient ring member.

10. A shaft seal construction according to claim 7, in which said forwardly projecting annular sealing lip has a forwardly tapering internal surface in sealing engagement with said shaft.

11. A shaft seal construction according to claim 7, in which said soft resilient ring member has a rear surface with a recess therein, said metal backing ring member being received in said recess and being flush with said rear surface.

12. A shaft seal construction according to claim 11, in which said backing ring member is bonded to said soft resilient ring member.

13. A shaft seal construction according to claim 1, in which soft resilient ring member has a rear surface with an annular recess therein, said metal backing ring member being received in said recess and being flush with said rear surface.

14. A shaft seal construction according to claim 13, in which said metal backing ring member is bonded to said soft resilient ring member.

* * * * *